May 8, 1928.
C. S. WORTH
PISTON RING
Original Filed Dec. 1, 1924
1,669,365
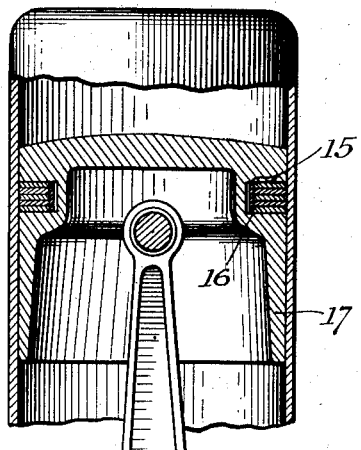
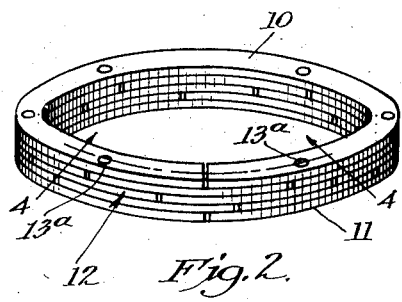
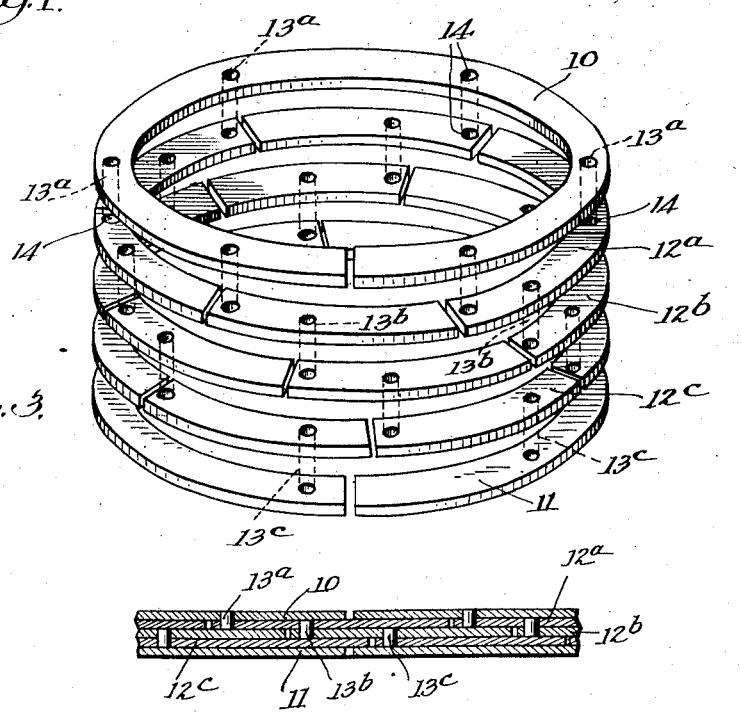
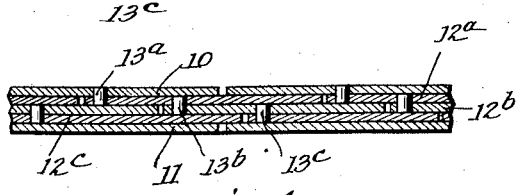
Inventor:
Clemens S. Worth,
by
Attorneys Patented May 8, 1928.

1,669,365

UNITED STATES PATENT OFFICE.

CLEMENS S. WORTH, OF LOS ANGELES, CALIFORNIA, ASSIGNOR, BY MESNE ASSIGNMENTS, TO EDWARD G. BURGHARD.

PISTON RING.

Application filed December 1, 1924, Serial No. 753,013. Renewed May 10, 1927.

This invention relates to piston rings, of the type commonly used in connection with internal combustion engine pistons, and the like. My foremost object of this invention is the provision of a piston ring of this character which has, as near as possible, an even and uniform engagement with the cylinder walls, without depending entirely upon the spring action of the ring itself to effect this even contact. Another object is to provide such a ring which will accomplish all of the sealing ordinarily necessary in engines of this character, obviating the necessity of a number of different rings spaced upon the piston.

The salient features of my invention are more fully set forth in the following specification reference being made therein to the accompanying drawings for purposes of illustration.

In these drawings:

Fig. 1 is a fragmentary sectional view illustrating the application of my invention to practical use;

Fig. 2 is a perspective view of the ring assembled and ready for use;

Fig. 3 is an enlarged perspective view illustrating the relative positions of the various component parts of the ring and their manner of assembly; and Fig. 4 is a sectional view taken as indicated by the line 4—4 of Fig. 2, the line being straightened for clarity of illustration.

In my preferred form of construction the ring is composed of top and bottom rings 10 and 11, which I will hereinafter refer to as anchor rings, between which a plurality of arcuate segmental ring members 12 are mounted to form intermediate rings 12ª, 12ᵇ and 12ᶜ. The anchor rings 10 and 11 are preferably of the usual split, spring type, as shown; and while I prefer to use both top and bottom anchor rings, either one or the other may be dispensed with, if desired, without departing from the spirit of my invention.

The segmental ring members may be of any preferred length; however, the shorter they are the more efficiently they will function. In my preferred form, as herein described, I prefer to divide each of the intermediate rings into 6 segments with their ends closely abutting each other and so arranged that the spaces between their ends will be staggered relative to those above and below them. This minimizes possibility of gases working past the piston by passing between them.

While several different methods of mounting these segmental members may be utilized I prefer the arrangement herein shown. In this arrangement the upper intermediate ring 12ª, consisting of 6 segments, is connected to the top anchor ring 10 by means of pins 13 rigidly secured therein and extending into apertures 14 adjacent one end of each segment, as shown. These segments freely pivot upon the pins 13 so their distal ends may oscillate in a horizontal plane towards and away from the cylinder wall. The next lower intermediate ring 12ᵇ is composed of the same number of ring segments, each connected to one of the segments comprising the ring 12ª by means of pivot pins 13ᵇ, rigidly secured to the latter and upon which these segments are free to oscillate. In a similar manner the next lower intermediate ring 12ᶜ is mounted upon the segments of the ring 12ᵇ by means of pivot pins 13ᶜ rigidly secured in the latter and upon which the segments of the ring 12ᶜ are free to oscillate.

In each case the segments oscillate about their pivot at one end and the next lower segment is mounted thereon intermediate this pivot and distal end so that the abutting ends of all segments in each intermediate ring will be staggered relative to the abutting ends of the segments forming the intermediate rings next below. I prefer that the spacing of the pivotal points of the segments forming each of the intermediate rings next below be such that in expanding or moving outwardly they will present a substantially even and unbroken surface throughout their aggregate periphery. It is to be understood, of course, that in making up this ring the common periphery of the ring, as a whole, will be cut to closely fit within the cylinder and that as wear occurs it will be readily compensated for by this pivotal action of the individual segments. It is clear that when the distal end of one segment moves it also carries with it the proximal end of the segment next below, and so on throughout all of the intermediate rings, so that in each case wear will be compensated for and any gaps filled by the adjacent segments.

While the anchor rings 10 and 11, or either one in case only one is used, will take care of the initial expansion of the ring against the cylinder walls, this may be augmented, in so far as the intermediate rings are concerned, by a band spring 15 (Fig. 1) placed intermediate the ring and the rear wall of its recess 16 in the piston 17.

While I have herein shown and described the preferred specific embodiment of my invention, it is nevertheless to be understood that I reserve the right to make changes or modifications in structures and arrangement as are permitted within the scope of the appended.

Having described a preferred form of my invention, I claim:

1. A piston ring comprising an anchor ring and a plurality of segmental ring members connected therewith to oscillate in planes transverse to its axis.

2. A piston ring comprising an anchor ring and a plurality of segmental ring members pivotally mounted thereon.

3. A piston ring comprising an anchor ring, a plurality of segmental ring members pivotally mounted thereon, and a plurality of similar ring members pivotally mounted on the first mentioned ring members.

4. A piston ring comprising a resilient, expansible and contractible anchor ring and a plurality of segmental ring members pivotally mounted thereon to oscillate in planes transverse to its axis.

5. A piston ring comprising a resilient expansible and contractible anchor ring, a plurality of segmental ring members pivotally mounted thereon, and a plurality of similar ring members each pivotally mounted on one of the first mentioned ring members and all adapted to oscillate in planes transverse to the axis of the anchor ring.

6. A piston ring comprising a resilient, expansible and contractible anchor ring, a plurality of segmental ring members pivotally mounted thereon, and one or more rings formed of similar segmental members, each of said segmental members being pivotally connected to one of the segmental members contiguous to it, all relatively offset and adapted to oscillate in planes transverse to the axis of the anchor ring.

7. A piston ring comprising a pair of resilient expansible and contractible anchor rings and a plurality of intermediate rings each formed of a plurality of segmental ring members, each of the segmental members contiguous to the anchor rings being pivotally connected thereto and each member being pivotally connected to another contiguous thereto.

8. The combination with a cylinder and a piston therefor having a ring groove, of a piston ring in said groove comprising an anchor ring and a plurality of segmental ring members pivotally mounted thereon and adapted to oscillate in planes transverse to the axis of the piston and yielding means in said groove to hold said members outwardly against the cylinder wall.

9. The combination with a cylinder and a piston therefor having a ring groove of a piston ring in the groove comprising a resilient expansible and contractible anchor ring, a plurality of segmental ring members pivotally mounted thereon, and one or more rings formed of similar segmental members, each of said segmental members being pivotally connected to one of the segmental members contiguous to it, all relatively offset and adapted to oscillate in planes transverse to the axis of the piston and spring means in said groove to hold said members outwardly against the cylinder wall.

In witness that I claim the foregoing I have hereunto subscribed my name this 14th day of October, 1924.

CLEMENS S. WORTH.